350-173. SR 08-31-71 XR 3,602,637

[11] 3,602,637

[72] Inventors Takashi Katsuta;
Fumio Ando; Masuo Kida; Mitsuru Kawasaki, all of Tokyo-to, Japan

[21] Appl. No. 766,684
[22] Filed Oct. 11, 1968
[45] Patented Aug. 31, 1971
[73] Assignee Nippon Electric Company, Limited Tokyo-to, Japan
[32] Priority Oct. 13, 1967
[33] Japan
[31] 42/86958

[54] OPTICAL SYSTEM FOR TRICOLOR SEPARATION

14 Claims, 3 Drawing Figs.

[52] U.S. Cl. .......... 178/5.4 ST, 350/173
[51] Int. Cl. .......... H04n 9/06, G02b 27/14
[50] Field of Search .......... 178/5.4 0, 5.4 ST, 5.4; 350/173

[56] References Cited

UNITED STATES PATENTS 3,202,039 8/1965 Lang et al. .......... 350/173

*Primary Examiner*—Robert L. Griffin
*Assistant Examiner*—John C. Martin
*Attorney*—Ostrolenk, Faber, Gerb and Soffen

ABSTRACT: A prism type optical system for tricolor separation used in conjunction with and positioned between an objective lens and color television camera devices. The improvement resides in a prism assembly in which the green light component of the light passing through the system is initially separated by a green reflective multilayer film interference filter; and the remaining red and blue light components are then separated from one another by means of a second multilayer film interference filter allowing for a significant reduction in the requirements of the spectral characteristics for producing the desired color components.

INVENTORS
TAKASHI KATSUTA
FUMIO ANDO
MASUO KIDA
METSURU KAWASAKI
BY
OSTROLENK, FABER, GERB & SOFFEN
ATTORNEYS

OPTICAL SYSTEM FOR TRICOLOR SEPARATION

The present invention relates to optical systems for use in tricolor separation, and more particularly to a prism-type optical system for use with color television cameras and the like in which improved spectral characteristics are provided.

Heretofore, it has been conventional to provide optical systems for tricolor separation, which optical systems are arranged between the objective lens and the color television cameras. One example of such color separating optical systems employing prisms is set forth in U.S. Pat. No. 3,202,039 issued to Hendrik de Lang et al. Aug. 24, 1965. In the prism system for use in color separation set forth in the above-mentioned U.S. Patent, three or more prisms are arranged in succession along a nonreflecting axis. Adjacent parallel planes of the prisms are separated by a thin airspace and/or a colored dichroic layer disposed therebetween wherein each of the spaces between parallel planes receiving a colored dichroic layer has provided therein a dichroic layer of differing color. In operation, the incident light enters into the prism system along the nonreflecting axis after passing through the objective lens of the color television camera. Initially, the red light component is selectively reflected by a first dichroic layer provided on a boundary surface of one of the prisms. The red light component is then totally reflected by another boundary surface of the same prism due to the air-glass transition along this boundary surface. The totally reflected red component emerges from a third boundary surface of the same prism causing beams of the red light component to be directed to a camera tube sensitive to red light. The light transmitted through the first dichroic layer, which includes the green and blue spectral regions of the visible spectrum, passes through another prism. The blue light component is selectively separated in a similar manner to that described above by being reflected by a second dichroic layer provided on the boundary surface of said other prism. This blue light component is further totally reflected by an air-glass transition along another boundary surface of the same prism and, after emerging from this prism is directed toward a second camera tube sensitive to blue light. Ultimately, the green light which is transmitted through the second dichroic layer is derived with no further reflection and supplied to a third camera tube sensitive to green light.

The above-mentioned color separating system of U.S. Pat. No. 3,202,039 has the advantage of providing a prism system whose glass length to be traversed by light is comparatively small and further providing a fairly favorable arrangement of the camera tubes for picking up the separated light thereby resulting in an arrangement which is comparatively compact due to the fact that the totally reflecting air-glass transitions are substantially flat.

However, in the above-mentioned U.S. Patent, each time the light components of the red and blue spectral regions are separated by respective dichroic layers, the spectral characteristics of these respective dichroic layers must be strictly defined since the respective light components to be separated by such dichroic layers occupy adjacent spectral regions in the visible spectrum and thereby have no spectral gap intervening between these regions. Thus the above-mentioned system has the disadvantage of requiring considerably high precision in arriving at the design of the spectral characteristics of the respective layers. Furthermore, even if the spectral characteristics were determined so as to strictly satisfy the above strict requirements, in the case where the direction of the nonreflecting light forms an incident angle of substantial magnitude with respect to the dichroic layer, the spectral characteristics of the dichroic layer are found to change considerably due to the undesirable polarization phenomena of the light. Consequently, in order to avoid changes in the spectral characteristics of the dichroic layer due to the polarization phenomena, such prior art systems have the absolute requirement that the respective dichroic layers must form angles of less than 30° with the planes which are aligned at right angles to the nonreflecting optical axis. This requirement imposes a second disadvantageous characteristic upon such prior art systems.

In addition to the above, the NTSC system imposes the requirement that the image resolution for the green light signal must be greatly enhanced in order to improve the quality of the color television image due to the visual characteristics of the human eye. In the above-mentioned prior art system the green light can be derived only after it has passed through both the first and second dichroic layers, and consequently the separated green light is subjected to flare and/or aberration in its optical path which seriously affects the resolution of the image, leading to a third disadvantage of the above-mentioned prior art system.

The present invention provides an arrangement in which all of the advantages of the above-mentioned prior art system are retained while the above-mentioned disadvantages have been eliminated through a novel arrangement of the prism-type optical system.

In accordance with one feature of the present invention, the novel prism-type optical system for use in tricolor separation in conjunction with color television cameras is comprised of a plurality of prisms joined in succession along a nonreflecting optical axis. One boundary surface of one of said prisms is provided with a green-reflective multilayer film interference filter which is also commonly referred to as a green-reflective dichroic layer. Another boundary surface of the same prism opposite the above-mentioned first boundary surface has an air-glass transition for the purpose of totally internally reflecting the green light component reflected against said other boundary surface by the green-reflective multilayer film interference filter. One boundary surface of an adjacent prism arranged behind the first prism is provided with a second multilayer film interference filter for separating the red light component from the blue light component. Another boundary surface opposite from the first boundary surface of the next adjacent prism has an air-glass transition for totally internally reflecting the light component reflected back by the second multilayer film interference filter, whereby the angle formed by the plane of the green-reflective multilayer film interference filter and the plane which is at right angles to the nonreflecting optical axis is limited to 30°. However, the angle formed by the plane of the second multilayer film interference filter and the plane which is at a right angle relative to the nonreflecting optical axis may be chosen to be any arbitrary value.

According to one embodiment of the present invention, the second multilayer film interference filter has the property of reflecting the red light component contained within the light transmitted through the green-reflective multilayer interference filter while transmitting the blue light component within the light transmitted through the green-reflective multilayer interference filter. It should be understood, however, that alternative embodiments may also be provided wherein the second multilayer film interference filter has the reverse property of reflecting blue light and transmitting red light since this color filter reversal leads to the same desired result.

Thus, contrasting the prior art system (set forth in U.S. Pat. No. 3,202,039) with the system of the present invention, the prior art system first separates the blue (or red) light component by selective reflection of a dichroic layer and then separates the red (or blue) light component subsequently by selective reflection of another dichroic layer, finally, separating the green light component after passing through the first and second dichroic layers, whereas the present invention operates to initially separate the green light component by means of a first green-reflective multilayer film interference filter while subsequently separating the remaining red and blue light components from one another by means of a second multilayer film interference filter which alteration in the chronological steps of separation allows for a significant reduction in the critical requirements of the spectral characteristics. Further, as a result of the above-mentioned arrangement, the quality of the color image is improved when employed in conjunction with color television camera devices and the severe requirements for the spectral characteristics and the angular relationship to the direction of the incident light of the second multilayer film interference filter is eliminated.

It is therefore one primary object of the present invention to provide a novel prism-type optical system for tricolor separation which may be advantageously used with color television camera systems wherein the green light component of the light passing through the prism system is separated prior to the separation of the red and blue light components.

Still another object of the present invention is to provide a novel prism-type optical system for tricolor separation and which may be advantageously used with color television camera systems wherein the prism assembly is provided with a green-reflective multilayer film interference filter for separating the green light component from the light passing through the prism system prior to separation of either the red or blue light components to thereby eliminate the critical design requirements of prior art systems and provide for good color purity in the color television picture while at the same time providing a small, compact optical system.

These as well as other objects of the present invention will become apparent from a consideration of the accompanying description and drawings in which.

Figure 1:
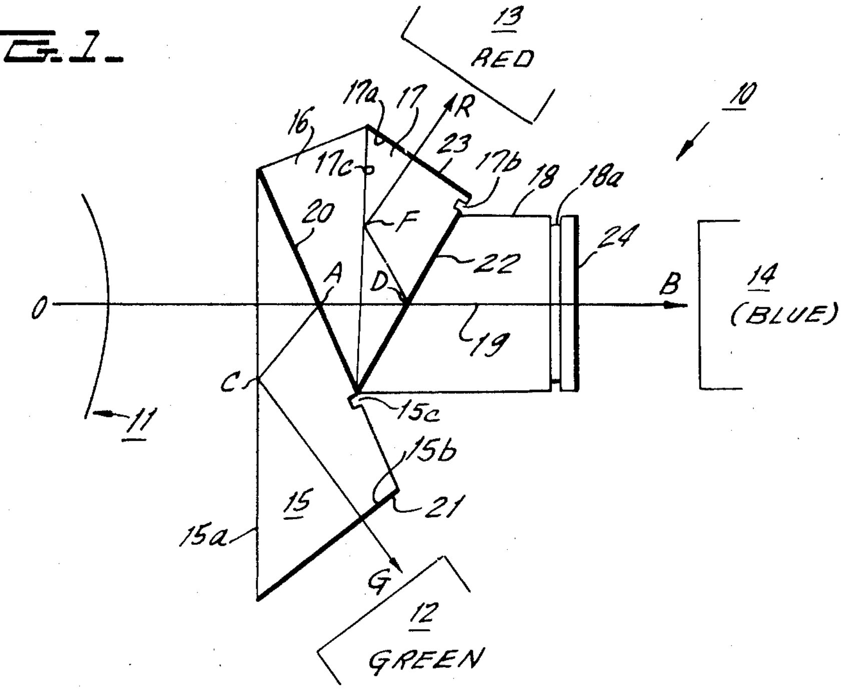
FIG. 1 is a schematic view of one preferred embodiment of the optical system for tricolor separation designed in accordance with the principles of the present invention, said figure being a schematic side view taken along a plane parallel to the three separated output light components.

FIG. 1 shows one preferred embodiment 10 of the optical system of the present invention for use in tricolor separation. The optical system of the present invention is shown as being positioned between an objective lens system 11 and camera tubes 12, 13 and 14 which are sensitive to the green, red and blue color components, respectively. In the embodiment 10 of FIG. 1, the optical system is comprised of four prisms 15–18 which are arranged in a predetermined manner. The straight line 19 extending between the objective lens system 11 and color sensitive tube 14 represents the nonreflecting axis of the system. A green-reflective multilayer film interference filter 20 is positioned along the common boundary surface between prisms 15 and 16. This interference filter 20 may be formed by depositing the film by a vaporization process upon either of the surfaces of prisms 15 or 16, or both. Boundary surface **15*a* of prism 15 provides an air-glass transition arranged substantially at right angles to the nonreflecting optical axis 19 extending between the objective lens 11 and the blue sensitive camera tube 14. A third boundary surface 15*b* of prism 15 is provided with a trimming filter 21** for trimming the green light to obtain the desired spectral characteristic which closely approximates the ideal spectral sensitivity represented by the waveform G of FIG. 2.

A thin planar parallel space is provided between the adjacent boundary surfaces of prisms 16 and 17 to form an air-glass transition along the entrance face of prism 17. A red-reflective multilayer film interference filter 22 is provided between the adjacent boundary surfaces of prisms 17 and 18. This interference filter may also be formed by a vaporization process on either boundary surface of the prism 17 or prism 18, or both. A third boundary surface **17*a* of filter 17 is provided with a trimming filter 23** for trimming the red light to obtain the desired spectral characteristic which approximates the ideal spectral sensitivity curve designated as R in FIG. 2.

Figure 2:
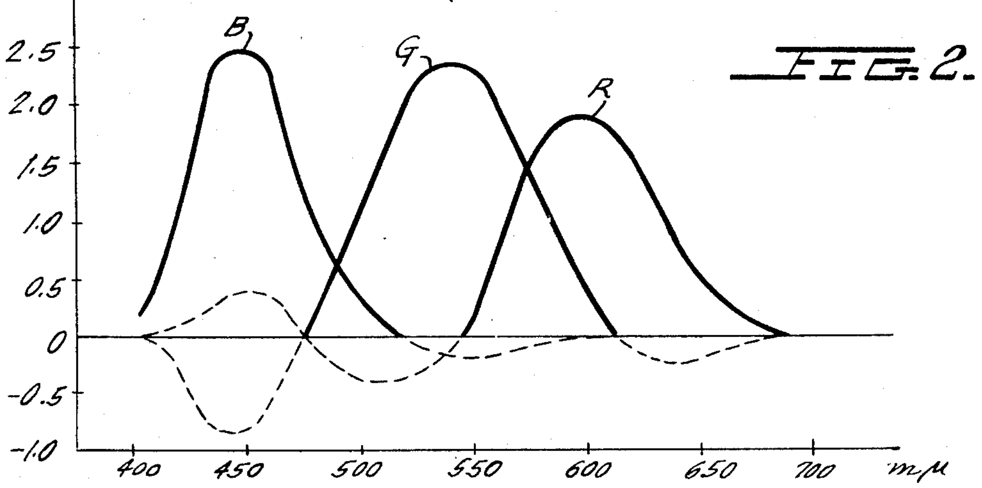
FIG. 2 is a plot showing the ideal spectral sensitivity curves required for color component transmission systems wherein sensitivity is plotted in accordance with an arbitrary logarithmic scale along the ordinate while the wavelength in microns is plotted along the abscissa.

The exiting face of prism 18 is provided with a trimming filter 24 for trimming the blue light to obtain the desired spectral characteristic which approximates the ideal spectral sensitivity curve B, shown in FIG. 2.

As may be clearly seen from FIG. 1 the prisms 15, 17 and 18 are provided with lateral grooves **15*c*, 17*b* and 18*a*** near their exiting surfaces which are arranged to prevent stray reflections in the prism system.

As is schematically shown in FIG. 2, the visual sensitivity of the human eye extends over the wavelength region of 400–700 millimicrons (m$\mu$), in which the blue, green and red color sensing organs of the human eye has spectral sensitivities B, G and R, respectively, as indicated in FIG. 2, which substantially covers the subregions 400–500 millimicrons (m$\mu$), 470–600 millimicrons (m$\mu$) and 550–700 millimicrons (m$\mu$), respectively. The visible radiation chart may also be found on page 24, FIG. 2.1 in the Text "Colour Television—The N.T.S.C. Systems Principles & Practice by P. S. Carnt and G. B. Townsend Copyright 1961, Published by The Chapel River Press Ltd." Thus, in a color television system such as the N.T.S.C. system in which the color information is conveyed through three (i.e. blue, green and red) channels and displayed at the receiver by synthesizing the three color components, it is a very important requirement that the respective blue, green and red image transmission systems for spectral sensitivities which approximate the ideal spectral sensitivity curves B, G, R, shown in FIG. 2, as closely as possible.

The operation of the optical system of FIG. 1 (limiting the description simply to a ray transmitted along the principal axis for simplicity) is as follows:

Light emanating from the objective lens system 11 of a color television camera device moves from the left toward the right and enters into the prism system of the present invention which is disposed adjacent the objective lens so that the light enters substantially at a right angle relative to the entrance face **15*a* of prism 15. The green light component contained in the light entering into the first prism 15 and having a spectral characteristic similar to the curve G of FIG. 2, is selectively reflected back by the green-reflective multilayer film interference filter 20 disposed along the boundary surfaces between prisms 15 and 16. This backwardly reflected green light component is totally reflected by the entrance face of 15*a* of prism 15 due to the air-glass transition causing the green light component to exit from the third face 15*b* of prism 15 after passing through trimming filter 21 which acts to further approximate the ideal spectral characteristic of the green light. The green light which has now been separated as described above, impinges upon camera tube 12 which is sensitive to the green light. Thus, the green light component can be seen to follow the path O–A–C–G, in moving toward camera tube 12**.

Figure 3:
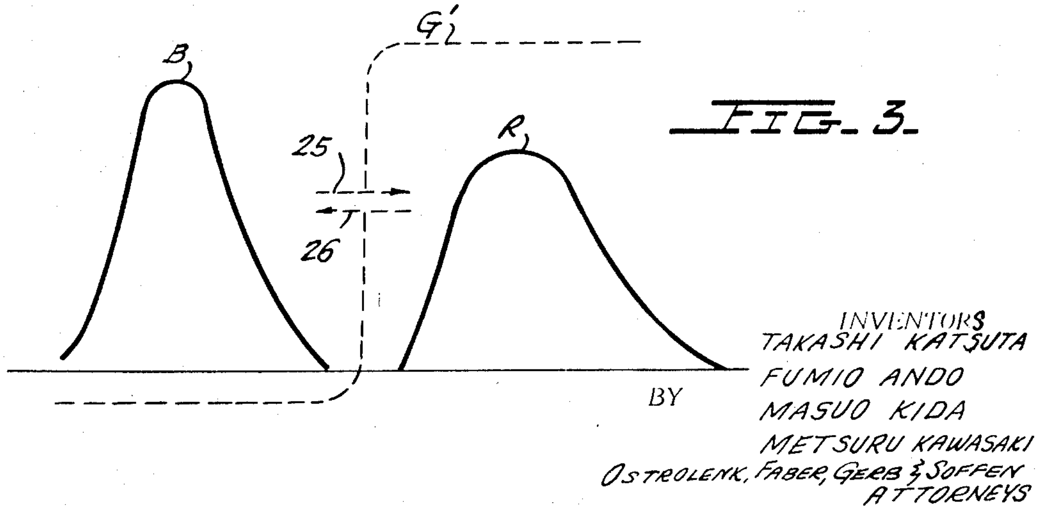
FIG. 3 is a plot showing a diagrammatic view useful in explaining the second stage of color separation in accordance with the present invention.

The remaining light directed toward the optical system 10 from objective 11 and which contains only the blue and red light components as schematically shown by the curves B and R of FIG. 3, are transmitted through the green-reflective multilayer film interference filter 20, the second prism 16, the thin planar space between prisms 16 and 17 and the third prism 17. The light reaching the boundary surface between prism 17 and prism 18, however, has its red light component, represented by the spectral distribution curve R in FIGS. 2 and 3, selectively reflected backwardly by the red-reflective multilayer film interference filter 22. The backwardly reflected red light component is then totally reflected by the entrance face **17*c* of prism 17 due to to the air-glass transition ultimately causing the red light component to exit through the third face 17*a* of prism 17 after passing through trimming filter 23 which aids in further approximating the ideal spectra character of the red light which is represented by the spectral distribution curve R of FIGS. 2 and 3. The red light component which has been separated in the manner above described then impinges upon camera tube 13** which is sensitive to the red light. The red light component can therefore be seen to follow the path O–A–D–F–R.

The remaining blue light component transmitted through the redireflective multilayer film interference filter 22 advances in straight line fashion through the fourth and final prism 18 and exits through the rear surface of filter 18 after passing through trimming filter 24 which acts to further enhance the blue light component to closely approximate the spectral characteristic of the blue light output as represented by the ideal spectral distribution curve B in FIGS. 2 and 3. Thus, the blue light component impinges upon camera tube 14 which is sensitive to blue light after having traveled along the path O–A–D–B.

Comparing the system 10 of FIG. 1, in its construction and operation with the optical system for tricolor separation such as is set forth in above-mentioned U.S. Pat. No. 3,202,039 the system of the present invention provides a number of distinct advantages over the prior art due to the fact that the green light component of the light impinging upon the optical system 10 is first separated from such impinging light and subsequently the red and blue light component for which the highest image resolution is required to cycophysical characteristics of the human eye, is separated through the shortest and simplest optical path of the prism system so that it is hardly subjected at all to flare and/or aberration which short and simple ray path thereby acts to improve image resolution. In addition thereto, the green lightcomponent is subjected to only the selective reflection of the first interference filter 20 and the total reflection at the air-glass transition boundary 15*a* at the entrance face of prism 15 and therefore the green light component does not experience any additional reflection and/or transmission by two or more multilayer film interference filters. However, if the incident light impinging upon the first multilayer film interference filter 20 should form a large angle with a line normal to the plane of the filter, an optical polarization effect would occur, thereby changing the spectral characteristic of the interference filter. Therefore, even in the case of the present invention, the angle formed by the plane of the first green-reflective multilayer film interference filter and the plane which is at a right angle to the nonreflecting optical axis 19 should be limited to a magnitude of less than 30°.

FIG. 3 shows the spectral distribution curves B and R for the blue and red light components, respectively, in the light transmitted through the green-reflective multilayer film interference filter 20. Spectral intensity is plotted along the abscissa. The dotted line curve G′ schematically represents the reflective power of the red-reflective multilayer film interference filter 22 which is plotted to the arbitrary scale but is the same wavelength scale as the spectral distribution curves B and R. As a result of the reflective power of the interference filter 22 and the spectral curves B and R, the blue light component B may be transmitted through the interference filter 22 while the red light component R may be reflected backwardly as was described above.

It should be noted that in the second stage of color separation, the light components B (blue) and R (red) which are to be separated from one another do not lie adjacent one another in the spectrum as is the case with the blue and green light components or the red and green light components, but, conversely, they are isolated from one another along the spectrum as is clearly shown in FIG. 3. Accordingly, in the second stage of color separation, the rather severe requirement for the spectral characteristic of the multilayer film interference filter 22 (as is the case for color separation of green light from blue light or red light from green light) is considerably diminished. Therefore, the present invention has the distinct advantage of simplicity in design in the spectral characteristic of the second multilayer film interference filter, especially as compared with the prior art system described hereinabove.

In addition, due to the isolated relationship between the blue and red light components as is clearly shown in FIG. 3, the variation of the spectral characteristic of the multilayer film interference filter 22 caused by optical polarization effects and the like does not substantially affect color separation during the second stage. Consequently, in contrast to the prior art system mentioned hereinabove, the incident angle of light impinging upon the second multilayer film interference filter need not be subjected to any angular limitation, and thus the angle formed by the plane of the second multilayer film interference filter and the plane which is at a right angle to the nonreflecting optical axis 19 may take any desired value including any angle whose value is equal to or greater than 30°, thereby resulting in another distinct advantage of the present invention. In FIG. 3 the dotted arrows 25 and 26 aligned in opposing directions associated with the cutoff portion of the reflective power curve, symbolically indicate the freedom of adjustment with may be made in the spectral characteristic of the second multilayer film interference filter 22.

Summarizing the above arrangement, it can be seen that the novel optical system for tricolor separation of the present invention has very distinct advantages over conventional systems in that it improves the quality of the color image by enhancing the image resolution for green light when employed in a color television camera device allowing the design of the spectral characteristic of the second multilayer film interference filter to be made in much simpler fashion and further allowing the angle formed by the plane of the second interference filter 22 and the plane which is at a right angle to the nonreflecting optical axis 19 to assume any desired value.

In the above description, by way of example, the second multilayer film interference filter has been described as having an optical property such that the red light component is reflected backwardly while the blue light component is transmitted therethrough. However, it should be quite obvious to those skilled in the art that the second interference filter 22 may be designed to have an opposite optical property such that the blue light component is reflected backwardly while the red light component is transmitted therethrough. In this case, it is only necessary to exchange the positions of the red trimming filter 23 and the red-sensitive camera tube 13 with those of the blue trimming filter 24 and the blue-sensitive camera tube 14. This rearrangement will also be found to retain all of the above-mentioned advantages of the present invention.

While the above-described embodiment of the present invention has been shown to be comprised of four prisms, it should also be apparent to those skilled in the art that the optical system may comprise any desired number of prisms according to the requirements of optical path equalization, camera tube location, and so forth, as has been disclosed in the above-mentioned U.S. Pat. No. 3,202,039.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. An optical system for tricolor separation advantageous for use in a color television camera device, comprising a plurality of prisms arranged in succession along a nonreflecting axis for separating the light directed toward said prism arrangement into a plurality of components, a first prism having a green-reflective multilayer film interference filter along one boundary surface, a second boundary surface opposing said first boundary surface and adapted, by virtue of air-glass transition, to totally reflect the green light component of the impinging light reflected back by said green-reflective multilayer film interference filter, a second prism having a first boundary surface adjacent said first prism first boundary surface, and having a second boundary surface provided with a second multilayer film interference filter for separating the red light component from the flue light component in the light transmitted through said first multilayer interference filter; said second prism first boundary surface adjacent to said first boundary surface of said first prism being adapted, by virtue of its air-glass transition to totally reflect the light component reflected back by said second multilayer film interference filter, whereby the angle formed by the plane of said green-reflective multilayer film interference filter and the plane which is at right angle to the nonreflecting optical axis is less than 30°, while the angle formed by the plane of said second multilayer film interference filter and the plane which is at right angle to the nonreflecting optical axis may be any arbitrary value without increasing the effect of the deleterious polarization phenomena.

2. The optical system of claim 1, in which said second multilayer film interference filter has an optical property such that the red light component is reflected back into said second prism while the blue component is transmitted therethrough such that at least one of the blue and red light components traverses a linear path throughout said optical system.

3. The optical system of claim 1, in which said second multilayer film interference filter has an optical property such tat the blue light component is reflected back while the red light component is transmitted therethrough.

4. The optical system of claim 1, further characterized in that green, red and blue trimming filters are respectively disposed in each optical path for the respective separated light components exiting from the optical system for further approximating the ideal spectral characteristics of the respective separated light output to the green, red and blue visual sensitivity characteristics of the human eyes.

5. An optical system of prism type for tricolor separation as claimed in claim 1, in which said air-glass transition along the second boundary surface of said second prism is formed by a thin planar space provided between the second boundary surface of said second prism and a first boundary surface of a third prism positioned between said first and second prisms.

6. An optical system of prism type for tricolor separation as claimed in claim 1, in which said first prism is located closest to the source of light directed to the optical system for color separation and said air-glass transition along said second boundary surface of said first prism is formed at the incident surface of said prism-type optical surface.

7. An optical system for separating color components from light impinging upon said system and directed along a nonreflecting axis comprising a first prism positioned along said axis and having an entrance surface through which said light enters, and first and second exit surfaces;

means provided along the first exit surface of said first prism for selectively reflecting a first component of said impinging light whose wavelength lies intermediate the ends of the visible light spectrum toward said entrance surface while permitting the remaining light components of said impinging light show wavelengths at least partially overlap and are above and below said reflected component to exist through said first exit surface;

said entrance surface reflecting said first light component toward said second exit surface causing said first light component to leave said first prism along a path transverse to the nonreflecting axis;

a second prism positioned along said axis and having an entrance surface and first and second exit surfaces; said second prism entrance surface being positioned to receive the remaining light components passing through said first means;

second means positioned along said second prism first exit surface for reflecting a second light component contained in the light passing through said first means whose wavelength lies above said first light component toward said second prism entrance surface while permitting the remaining light component whose wavelength lies below and is nonoverlapping with said first light component to exit through said second prism first exit surface;

said second prism entrance surface reflecting said second light component toward said second exit surface and causing said second light component to leave said second prism along a path transverse to said axis.

8. An optical system for separating color components from light impinging upon said system and directed above a nonreflecting axis comprising a first prism positioned along said axis and having an entrance surface through which said light enters, and first and second exit surfaces;

means provided along the first exit surface of said first prism for selectively reflecting a first component of said impinging light whose wavelength lies intermediate the ends of the visible light spectrum toward said entrance surface while permitting the remaining light components of said impinging light whose wavelengths partially overlap and are above and below said reflected component to exit through said first exit surface;

said entrance surface reflecting said first light component toward said second exit surface causing said first light component to leave said first prism along a path transverse to the nonreflecting axis;

a second prism positioned along said axis and having an entrance surface and first and second exit surfaces; said second prism entrance surface being positioned to receive the remaining light components passing through said first means;

second means positioned along said second prism first exit surface for reflecting a second light component contained in the light passing through said first means whose wavelength lies below and is nonoverlapping with said first light component toward said second prism entrance surface while permitting the remaining light component whose wavelength lies above and is nonoverlapping with said first light component to exit through said second prism first exit surface;

said second prism entrance surface reflecting said second light component toward said second exit surface and causing said second light component to leave said second prism along a path transverse to said axis.

9. The optical system of claim 7 further comprising a third prism positioned along said axis and having an entrance and an exit surface;

said entrance surface positioned adjacent said second means to cause the light component passed by said second means to leave said third prism through its exit surface along a path parallel to said nonreflecting axis.

10. The optical system of claim 8 further comprising a third prism positioned along said axis and having an entrance and an exit surface;

said entrance surface being positioned adjacent said second means to cause the light component passed by said second means to leave said third prism through its exit surface along a path parallel to said nonreflecting axis.

11. The optical system of claim 9 further comprising first, second and third pickup means each being respectively sensitive to said first, second and remaining light components and being positioned to intercept their associated light components separated by said optical system for generating signals representative of the light components impinging upon said pickup means.

12. The optical system of claim 10 further comprising first, second and third pickup means each being respectively sensitive to said first, second and remaining light components and being positioned to intercept their associated light components separated by said optical system for generating signals representative of the light components impinging upon said pickup means.

13. The optical system of claim 9 further comprising first, second and third light trimming means being positioned adjacent said first prism, second exit surface, said second prism second exit surface and said third prism exit surface respectively for modifying their respective exiting light components to cause the characteristics of said light components to approach the ideal spectral characteristics to achieve color purity 14. The optical system of claim 10 further comprising first, second and third light trimming means being positioned adjacent said first prism second exit surface, said second prism second exit surface and said third prism exit surface respectively for modifying their respective exiting light components to cause the characteristics of said light components to approach the ideal spectral characteristics to achieve color purity.